(12) United States Patent
Shi et al.

(10) Patent No.: US 11,396,858 B2
(45) Date of Patent: Jul. 26, 2022

(54) WIND-WAVE COMPLEMENTARY ENERGY INTEGRATED SYSTEM BASED ON FIXED FOUNDATION AND POWER GENERATION AND TRANSMISSION METHOD THEREOF

(71) Applicant: DALIAN UNIVERSITY OF TECHNOLOGY, Dalian (CN)

(72) Inventors: Wei Shi, Dalian (CN); Songhao Zhang, Dalian (CN); Zhiyu Jiang, Dalian (CN); Xiaorong Ye, Dalian (CN); Ling Wan, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 17/286,267

(22) PCT Filed: Nov. 4, 2019

(86) PCT No.: PCT/CN2019/115423
§ 371 (c)(1),
(2) Date: Apr. 16, 2021

(87) PCT Pub. No.: WO2020/143287
PCT Pub. Date: Jul. 16, 2020

(65) Prior Publication Data
US 2021/0355904 A1 Nov. 18, 2021

(30) Foreign Application Priority Data
Jan. 8, 2019 (CN) .......................... 201910014256.0

(51) Int. Cl.
*F03B 13/18* (2006.01)
*F03D 9/00* (2016.01)

(52) U.S. Cl.
CPC .............. *F03B 13/18* (2013.01); *F03D 9/008* (2013.01)

(58) Field of Classification Search
CPC ...... F03B 13/18; F03B 13/186; F03B 13/185; F03B 11/00; F03B 13/00; F03D 9/008;
(Continued)

(56) References Cited

U.S. PATENT DOCUMENTS

| 4,508,972 A * | 4/1985 | Willmouth | F03D 15/10 |
| | | | 416/DIG. 4 |
| 6,320,273 B1 * | 11/2001 | Nemec | F03D 7/0228 |
| | | | 290/43 |

(Continued)

FOREIGN PATENT DOCUMENTS

| CN | 102146870 A | 8/2011 |
| CN | 107091193 A | 8/2017 |
| CN | 109611275 A | 4/2019 |

OTHER PUBLICATIONS

International Search Report issued in corresponding International Application No. PCT/CN2019/115423; dated Jan. 23, 2020; State Intellectual Property Office of the P R. China, Beijing, China, 6 pgs.
(Continued)

*Primary Examiner* — Hoang M Nguyen
(74) *Attorney, Agent, or Firm* — Hauptman Ham, LLP

(57) ABSTRACT

The wind-wave complementary energy integrated system based on fixed foundation and generation and transmission method thereof pertains to the field of ocean renewable energy utilization, solving the problem of combining the wind and wave energy in a support structure, including a wind turbine, a tower, a wave energy device and a single pile foundation, the wind turbine is connected to the tower, and the single pile foundation is at the bottom of the tower, the single pile foundation is connected to the seabed, and the wave energy device is mounted on the tower near the sea surface. The effect is the renewable energy utilization rate
(Continued)

and the energy conversion rate are effectively improved, thus reducing the cost to a certain extent and having high utility.

5 Claims, 2 Drawing Sheets

(58) Field of Classification Search
CPC ...... F03D 13/25; F03D 80/00; F05B 2210/18; F05B 2220/705; F05B 2240/912; F05B 2240/95; F05B 2250/33; F05B 2260/4031; Y02E 10/20; Y02E 10/30; Y02E 10/72; Y02E 10/727
USPC ........ 60/698, 495, 497, 502; 290/42, 44, 53, 290/55
See application file for complete search history.

(56) References Cited

U.S. PATENT DOCUMENTS

| 2011/0254271 | A1* | 10/2011 | Freeman | ............... | F03B 13/264 |
| | | | | | 60/502 |
| 2012/0261923 | A1* | 10/2012 | Hassavari | ............... | B63B 35/44 |
| | | | | | 290/55 |

OTHER PUBLICATIONS

Written Opinion issued in corresponding International Application No. PCT/CN2019/115423; dated Jan. 23, 2020; State Intellectual Property Office of the P.R. China, Beijing, China, 7 pgs.

* cited by examiner

WIND-WAVE COMPLEMENTARY ENERGY INTEGRATED SYSTEM BASED ON FIXED FOUNDATION AND POWER GENERATION AND TRANSMISSION METHOD THEREOF

RELATED APPLICATIONS

The present application is a National Phase of International Application Number PCT/CN2019/0115423 filed Nov. 4, 2019, and claims priority to Chinese Application Number 201910014256.0, filed Jan. 8, 2019.

TECHNICAL FIELD

The present invention pertains to the field of ocean renewable energy utilization, and relates to a wind-wave complementary energy integrated device integrating wind energy and wave energy, and a power generation system that combines wind energy and wave energy based on a fixed single pile structure.

BACKGROUND OF THE INVENTION

Under the great pressure of scarcity of fossil energy, to reduce environment pollution and react to climate change, international society accelerates the exploitation and utilization of ocean renewable energy. As a kind of clean renewable energy, offshore wind energy has become the new direction of international wind power development, which attracts global attentions. Offshore wind power development offers technical support for saving energy and reducing emission, and adapting climate change, which meets China's strategic demands of building an energy-saving and environment-friendly society. Owing to rich offshore wind energy resource of coastal areas of China, there will be great potential for offshore wind energy. Comparing to onshore wind energy, offshore wind energy has abundant wind resource of good quality without influence of topography, which is the main direction of China's wind energy development in the future. Furthermore, waves and wind are naturally correlated. The areas with rich wind energy usually accompanied with abundant wave energy. However, due to low energy conversion rate, high generation costs, and rather low reliability of wave energy converter, commercialization of this kind of generator are limited to some extent. At present, wind energy development technology is relatively mature, especially in nearshore shallow water area. At present, due to simple structure, convenient installation, and good economic return, single pile foundation is a comparative general foundation mode. Although energy generated by periodic waves are instable and discontinuous, waves are transformed from irregular turbulent flow to regular impulse water-flow under the influence of the sea wind, which provides possibility of comprehensive utilization of wind and wave energy.

Multi-energy complementary mode is an effective way to utilize ocean renewable energy. Combining offshore wind and wave energy generation by using common support structure and power transmission system, the utilization rate of resources and power generation efficiency can be improved effectively, thus enhancing economy of ocean renewable energy power generation system, reducing costs and boost its commercialization.

SUMMARY

In order to utilize the natural correlation characteristic of wind and waves to solve the problem of united use of wind and wave energy in a supporting structure, the present invention proposes to solve the following technical problems: a wind-wave complementary energy integrated system based on a fixed foundation, including a wind turbine, a tower, a wave energy device and a single pile foundation. The wind turbine is connected to the tower, and the single pile foundation is at the bottom of the tower, the single pile foundation is connected to the seabed, and the wave energy device is mounted on the tower near the sea surface.

Furthermore, the wave energy device includes a sleeve and a movable frame. The movable frame is a 3-dimensional rectangular frame, wherein a top frame, a bottom frame and a hollow part between the 3-dimensional rectangular frame are penetrated by the tower so that the 3-dimensional rectangular frame is sleeved on an outer periphery of the tower. The sleeve is centered by the tower and sleeved and fixed on the tower near the sea surface. Two long sides of the bottom frame of the movable frame are round-smooth straight bars. Along the direction of the long sides, two round-smooth straight bars penetrate an opposite peripheral surface of the sleeve, so that the round-smooth straight bars can be connected to the tower and support the movable frame to be sleeved in an outer circumference of the tower. Two opposite short-side frames of the movable frame, a horizontal frame is installed between two opposite vertical rods of each short side frame, a rack along the long side is installed between the two horizontal frames on the two opposite short side frames, two ends of each rack are fixed to the two horizontal frames, and the racks are located between the long side and the tower in the horizontal direction, above the racks, a gear is engaged with the racks, the gear is connected to a generator by a rotation shaft, the generator is installed on a motor support platform, the motor support platform is fixed to the tower or the sleeve near the racks, the two opposite short side frames of the movable frame are both installed with a wave shield.

Furthermore, the sleeve is a solid sleeve which is sleeved on the outer circumference the tower and has a sliding groove adaptive to the shape of the round-smooth straight bar in order to allow the round-smooth straight bar to move inside the sleeve. The contact surface with the round-smooth straight bar is a sliding surface.

Furthermore, the shape of wave shield is an irregular curved surface.

Furthermore, the axial direction between the two generators located on both sides of the tower is orthogonal to the motion direction of the movable frame.

A method for power generation and transmission of the wind-wave complementary energy integrated system based on the fixed foundation, wherein the wind turbine generates electric energy under an effect of wind power, by pushing the wave shield the wave energy prompts the movable frame to reciprocate along the direction of the round-smooth straight rod, and the racks to reciprocate, to drive the gear engaged therewith to rotate, a rotating motion is transmitted through a shaft, making the generator connected to the gear through the shaft generates power, and the conversion of wave energy to electrical energy is realized, the electric energy is transmitted to a grid together with the electric energy generated by the wind energy device through the transmission system of the wind turbine.

Beneficial Effects: The invention provides a wind and wave complementary energy integrated system based on fixed foundation pertains to the field of ocean renewable energy utilization. The integrated system in the ocean that combining wind energy and wave energy makes two kinds of energy sharing common structure and power transmission system. The device effectively improves resources utilization rate and power generation efficiency, reducing costs to a certain extent and ensuring high utility. Single pile wind turbine has the characteristics of simple structure, convenient construction, low construction costs, and wide application range. At the same time, the device collects wind and wave energy to generate power, which effectively enhances power generation efficiency and reduces energy costs. The wind energy device is fixed on the single pile foundation through the sleeve, without destroying or changing the initial wind turbine base structure, which can ensure the safe operation of the wind turbine. Two sets of wave energy devices are symmetrically distributed on both sides of the single pile foundation. These not only improve the power generation of wave energy system, but also ensure the stability of the system. The device has reasonable structure design and mature construction scheme and technology.

Figure 1:
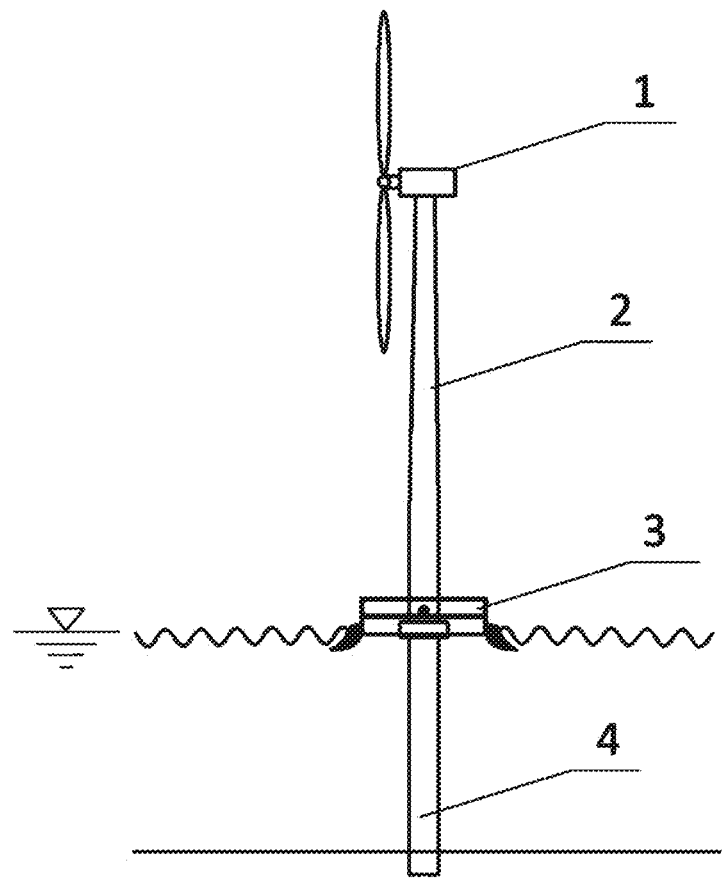
FIG. 1 is the schematic diagram of the entire structure of the wind-wave complementary integrated energy system.

FIG: 1 wind turbine, 2 tower, 3 wave energy device, 4 single pile foundation, 5 sleeve, 6 wave shield, 7 rack, 8 gear, 9 movable frame, 10 generator, 11 horizontal frame, 12 round-smooth straight bar, 13 motor support platform.

DETAILED DESCRIPTION OF THE IMPLEMENTATION

In order to enhance the understanding, the present invention will be further described in conjunction with accompanying technical scheme and drawings hereinafter.

Example 1: A wind-wave integrated energy generating system based on fixed foundation, including a wind energy generation system and a wave energy generation system.

The wind energy generation system includes wind turbine 1, tower 2, single pile foundation 4 and a power transmission system. The wind turbine 1 is a megawatt horizontal axis wind energy generator, which is connected to the single pile foundation 4 through the tower 2. The single pile foundation 4 is fixed on the seabed.

The described wave energy generation device is a reciprocating wave energy converter, including a wave energy acquisition system and a power generation system. The wave energy acquisition system consists of three parts: movable frame 9, rack 7, wave shield 6, and is located near the sea level. Two round-smooth straight bars 12 that are located at the lower part of the movable frame 9 are respectively connected to the sleeve by inserting and passing through the sleeve 5 on both sides of single pile foundation. There is an adequately small coefficient of friction between two round-smooth straight rods and the inserted sleeve hole. The ends of two racks 7 are welded to the center crossbar on two sides of the frame. Two racks 7 extend across the two sides of the single pile foundation respectively and are engaged with gears 8 located on both sides of the single pile foundation. Two wave shields 6 are fixed on the two sides of the frame respectively.

The shape of wave shield 6 adapts an irregular curved surface, which is beneficial to capture the energy in the wave to the maximum extent and can be further optimized.

The power generation system is composed of support platform 13, generator 10 and gear 8. Axial direction of two generators on both sides of single pile is orthogonal to the motion direction of the frame 9 of the wave energy acquisition system (the movement direction of the rack). Support platform 13 is connected to the sleeve 5 by adding a supporting frame at the lower part of the platform. Generator 10 is fixed on the platform through supporting frame at the lower portion of the generator. Rack 7 fixed to movable frame 9 is engaged with gear 8. Gear 8 and generator 10 are connected by a rotating shaft. The effect of waves on the wave breaker 6 pushes the frame 9 to reciprocate, that is the reciprocating movement of the rack 7 drives the gear 8 to rotate, thereby driving the generator to generate electricity.

For most of time, wind and waves are strong or weak contemporaneously. For the acquisition mode of independent wave and wind energy, strong wind and wave is apt to cause bad performance of energy conversion wind and wave resistance of the device, making the platform instable. Since the part of energy not to be collected greatly affects the platform stability, strong wind is disruptive for collecting wave energy while strong wave is disruptive for collecting wind energy. In this case, if wave energy can be collected while collecting wind energy, the impact of wave energy that is not collected to the platform stability can be reduced. In this case, energy can be collected, transferred and transmitted at the same platform for sufficient and reasonable use of energy and facilities. Alternatively, it can reduce the impact of energy not to be collected to the platform stability when collecting separately under strong wind and waves.

Figure 2:
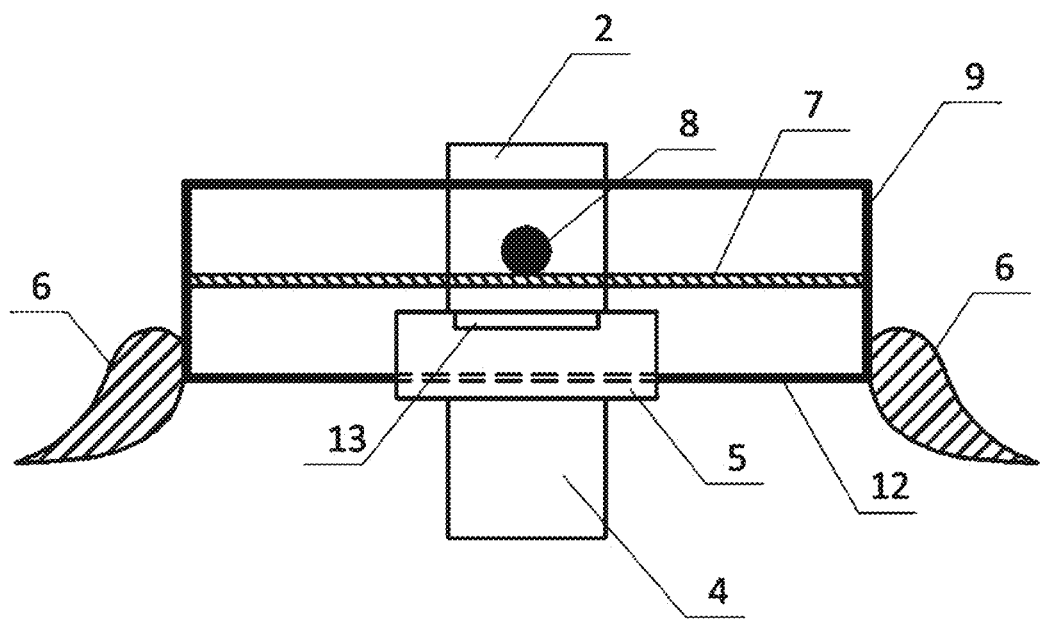
FIG. 2 is the side view of the partial connection of the wind-wave complementary integrated energy system.
Figure 3:
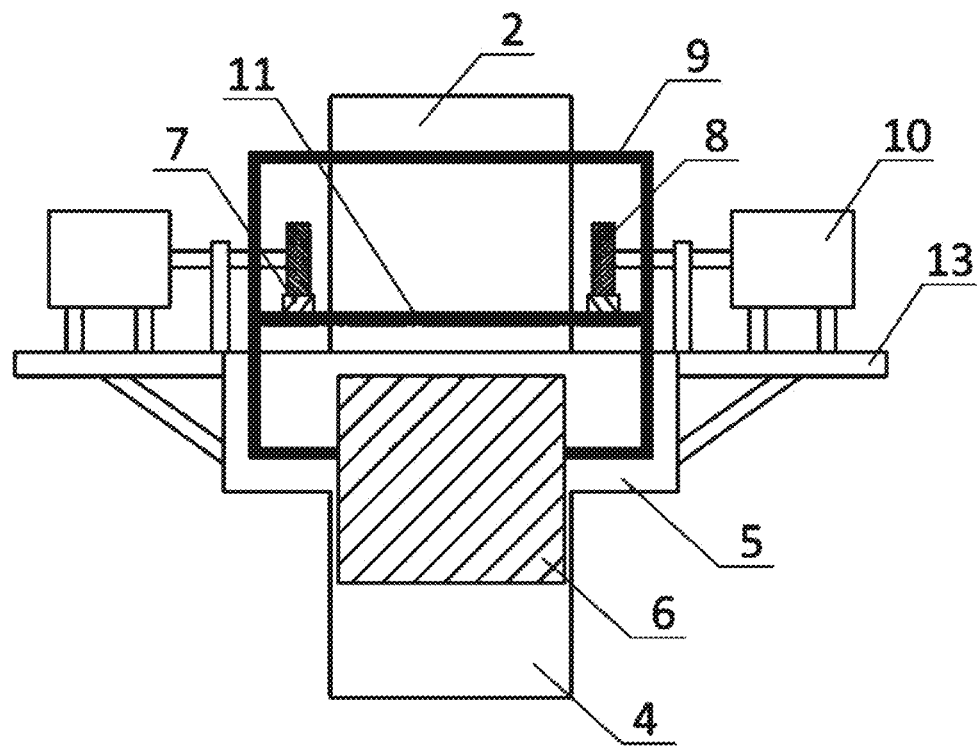
FIG. 3 is the front view of the partial connection of the wind-wave complementary integrated energy system.
Figure 4:
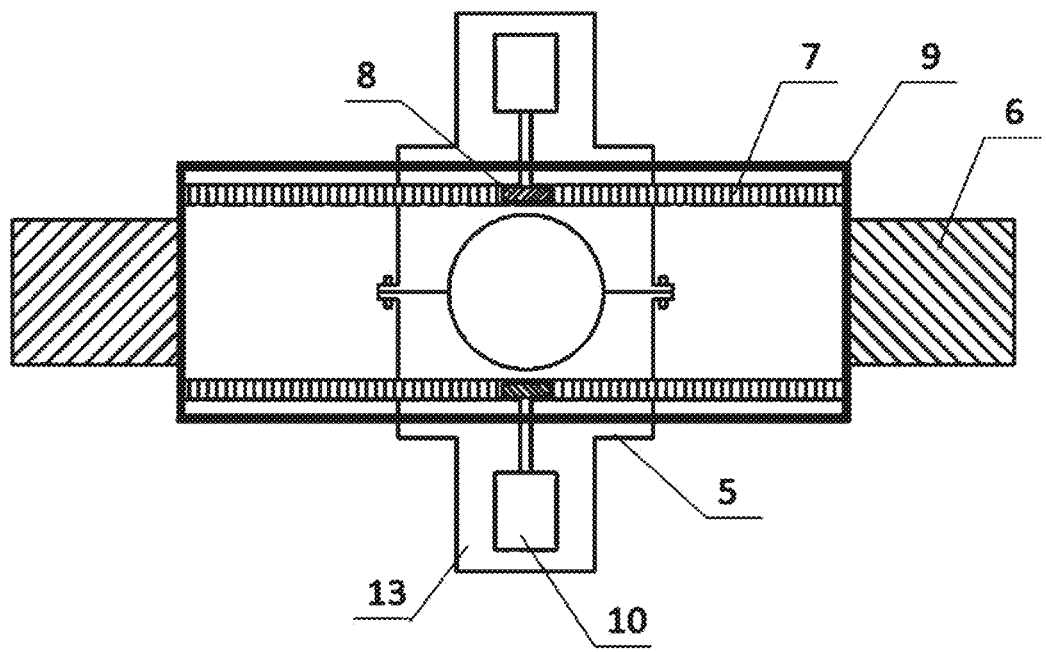
FIG. 4 is the top view of the partial connection of the wind-wave complementary integrated energy system.

Example 2: As shown in FIGS. 1 and 2, horizontal axis wind turbine 1 is connected to seabed through tower 2 and single pile foundation 4. The wave energy power generation device is a reciprocating wave energy conversion device that comprises two systems, namely, an energy capture system and a power generation system. The wave energy power generation device is located near the sea level of the single pile foundation. The energy capture system comprises movable frame 9, rack 7, wave shield 6. The power generation system comprises supporting platform 13, generator 10 and gear 8. These two systems are respectively connected to the single pile foundation 6 through the sleeve 5 to minimize the damage and change of the original wind turbine single pile foundation caused by the wave energy device.

As shown in FIG. 2, two round-smooth straight bars 12 at the lower part of the movable frame 9 are respectively connected to the sleeve by passing through the sleeve 5 on both sides of the single pile foundation. It can effectively support the movable frame 9, ensuring its horizontal movement. The ends of two racks 7 are welded to the center crossbar of the front and rear sides of the frame, so that the two racks 7 are locate on both sides of the single pile foundation respectively and engaged with gears 8. Two wave shields 6 are respectively fixed on the front and rear sides of the frame 9 and perform reciprocating movement under the action of wave. Support platform 13 is connected to sleeve 5 by adding a supporting frame to the lower part of the platform. The generator is fixed to the support platform 13 through supporting frame at the lower portion of the generator. Two gears 8 are respectively connected to the generator by the transmission shaft.

The working method is: the wind turbine 1 generates power under the effect of wind power; the energy in the wave pushes the wave shield 6, to cause the movable frame 9 to reciprocate along the direction of the round-smooth straight bar 12, and the rack 7 is also made to reciprocate, thereby driving the rotating movement of the gear 8 engaged therewith it, thereby pushing the generator 10 connected to the gear through the rotating shaft to generate electricity, so as to realize the conversion of wave energy into electric energy. The electric energy is transmitted to the grid through the transmission system of the wind turbine 1 and the electric energy generated by the wind energy device.

The construction and installation steps of wind-wave complementary integrated energy system based on fixed foundation are as follows: Firstly, based on the existing offshore wind turbine single pile construction technology, the single pile foundation 4 is first installed on the seabed. Then, the sleeve 5, the energy capture system and the power generation system are assembled on the shore, using a professional construction boat to transport the assembled wave energy device to the installation location for further installation. The final step is to install the tower 2 and the top wind turbine 1 are installed to complete the construction and installation of the energy integrated generation system.

The present invention adapts a single pile foundation supporting structure with convenient fabrication, installation and construction, and the cost is low. Wind and wave energy power generation can be completed on the same support structure, sharing a support platform and power transmission support system. It can significantly reduce power generation costs and make the structure stable and reasonable, which further prove the feasibility of the present invention and remarkable technical effects.

Factors considered in the product design of the invention are as follows:

1. The energy capture system is connected to the single pile foundation 4 by inserting and passing through the sleeve 5 on both sides of the single pile foundation through the two round-smooth straight rods 12 at the lower part of the movable frame 9. Since the wave action can reciprocate under the action of waves, it is necessary to ensure that there is a sufficiently small friction coefficient between the two round smooth rods and the inserted sleeve hole track.

2. Considering the large volume of the sleeve, the sleeve cannot adopt a solid structure. The internal structure should be specially hollowed out, to reduce the quality of sleeve and assure the structure intensity of the sleeve.

Example 3: A wind-wave complementary energy integrated system based on fixed foundation, including wind turbine 1, tower 2, wave energy device 3 and single pile foundation 4. Wind turbine 1 is connected to tower 2. The bottom of the tower 2 is the single pile foundation, and the single pile foundation 4 is connected to seabed. Wave energy devices 3 are mounted to the tower near the sea surface.

The wave energy device includes sleeve 5 and movable frame 9. Movable frame 9 is a three-dimensional rectangular frame. The 3-D rectangular frame includes the opposite top and bottom frames, two opposite short-side frames, and two opposite long-side frames, which are all rectangular. The top frame, the bottom frame and the hollow part between the three-dimensional rectangular frame are penetrated by tower 2 so that the three-dimensional rectangular frame is sleeved on the outer periphery of the tower 2. Sleeve 5 is centered by tower 2 and sleeved and fixed on the tower 2 at a position near the sea surface. Two long sides of the bottom frame of movable frame 9 are round-smooth straight bars 12 along the direction of the long side. The two round-smooth straight bars 12 penetrate the opposite peripheral surface of the sleeve 5, so that round-smooth straight bars 12 can be connected to tower 2 and support movable frame 9 to be sleeved in the outer circumference of the tower 2. So that, two round-smooth straight bars 12 can move inside sleeve 5 along the longitudinal direction, in addition, using the two short sides of the bottom frame restrict the two round-smooth straight bars 12 of the bottom frame not to deviate from the sleeve 5. Thus, the movable frame 9 can move along the direction of long side and is restricted by short side. Two opposite short-side frames of movable frame 9, on which the horizontal frame 11 are installed between two opposite vertical rods of each short-side frame. The height of the horizontal frame 11 can be adaptively adjusted according to the installed position of wind turbine. Rack 7 along the direction of the long side is installed between the two horizontal frames 11 on the two opposite short frames. Two ends of each rack 7 are fixed on two horizontal frames 11, and each rack 7 is located between the long side and tower 2 in the horizontal direction. Above rack 7 there is gear 8 engaged, the gear 8 is connected to generator 10 by a rotation shaft. Generator 10 is installed on motor support platform 13, the motor support platform 13 is fixed to tower 2 or sleeve 5 near rack 7. Two comparative short-side frames of movable frame 9 are equipped with wave shield 6 thereon.

The sleeve 5 is a solid sleeve 5, which is sleeved on the outer circumference of the tower 2, and has a sliding groove adapted to the shape of the round smooth straight rod 12 in order to allow the round-smooth straight bar 12 to move inside the sleeve 5, and a contact surface with the round-smooth straight bar 12 is a sliding surface.

The shape of wave shield 6 is irregular curved surface.

The axial direction of two generators 10 located on both sides of tower 2 is orthogonal to the moving direction of movable frame 9.

A method for power generation and transmission of the wind-wave complementary energy integrated system based on the fixed foundation: wherein the wind turbine 1 generates electric energy under an effect of wind power, by pushing the wave shield 6 the wave energy prompts the movable frame 9 to reciprocate along the direction of the round-smooth straight rod 12, and also makes the racks 7 to reciprocate, to drive the gear 8 engaged therewith to rotate, a rotating motion is transmitted through a shaft, making the generator 10 connected to the gear 8 through the shaft generates power, and the conversion of wave energy to electrical energy is realized, the electric energy is transmitted to a grid together with the electric energy generated by the wind energy device through the transmission system of the wind turbine 1.

The above is the preferred implement approach of the invention, the protection range is not limited to what mentioned above. Any technician who is familiar with this technical field replaces or revises technical schemes and inventive created on the basis of the present invention within the technical scope disclosed in this invention, schemes and inventive should be involved in the protection range of this invention.

The invention claimed is:

1. A wind-wave complementary integrated energy system based on a fixed foundation, comprising a wind turbine, a tower, a wave energy device and a single pile foundation, wherein the wind turbine is connected to the tower, the single pile foundation is at a bottom of the tower, the single pile foundation is connecting to a seabed, and the wave energy device is mounted on the tower near a sea surface, the wave energy device comprises a sleeve and a moveable frame, and the movable frame is a 3-dimensional rectangular frame, wherein a top frame, a bottom frame and a hollow part between the 3-dimensional rectangular frame are penetrated by the tower so that the 3-dimensional rectangular frame is sleeved on an outer periphery of the tower, the sleeve is centred by the tower and sleeved and fixed on the tower near the sea surface, two long sides of the bottom frame of the movable frame are round-smooth straight bars, along a direction of the long sides, the two round-smooth straight bars penetrate an opposite peripheral surface of the sleeve, so that the round-smooth straight bars can be connected to the tower and support the movable frame to be sleeved in an outer circumference of the tower, the two opposite short side frames of the movable frame, a horizontal frame is installed between two opposite vertical rods of each short side frame, a rack along the long side is installed between the two horizontal frames on the two opposite short side frames, two ends of each rack are fixed to the two horizontal frames, and the racks are located between the long side and the tower in the horizontal direction, above the racks, a gear is engaged with the racks, the gear is connected to a generator by a rotation shaft, the generator is installed on a motor support platform, the motor support platform is fixed to the tower or the sleeve near the racks, the two opposite short side frames of the movable frame are both installed with a wave shield.

2. The wind-wave complementary energy integration system based on the fixed foundation according to claim 1, wherein the sleeve is a solid sleeve, sleeved on the outer circumference the tower and having a sliding groove adapted to a shape of the round-smooth straight bar in order to allow the round-smooth straight bar to move inside the sleeve, and a contact surface with the round-smooth straight bar is a sliding surface.

3. The wind-wave complementary energy integration system based on the fixed foundation according to claim 1, wherein a shape of the wave shield is an irregular curved surface.

4. The wind-wave complementary energy integration system based on the fixed foundation according to claim 1, wherein an axial direction between the two generators located on both sides of the tower is orthogonal to the moving direction of the movable frame.

5. A method for power generation and transmission of the wind-wave complementary energy integrated system based on the fixed foundation according to claim 1, wherein the wind turbine generates electric energy under an effect of wind power, by pushing the wave shield the wave energy prompts the movable frame to reciprocate along the direction of the round-smooth straight rod, and also makes the racks to reciprocate, to drive the gear engaged therewith to rotate, a rotating motion is transmitted through a shaft, making the generator connected to the gear through the shaft generates power, and the conversion of wave energy to electrical energy is realized, the electric energy is transmitted to a grid together with the electric energy generated by the wind energy device through the transmission system of the wind turbine.

* * * * *